United States Patent Office 3,373,009
Patented Mar. 12, 1968

3,373,009
NUTRIENT PLANT MATRIX
Malcolm E. Pruitt, Lake Jackson, and Joseph M. Baggett, Freeport, Tex., assignors to The Dow Chemical Company, Midland, Mich., a corporation of Delaware
No Drawing. Filed July 30, 1964, Ser. No. 386,430
11 Claims. (Cl. 71—28)

This invention relates to plant growth and more particularly to a novel, improved, and long-lasting medium for the growth and propagation of pot plants.

The term "pot plants" is used herein to distinguish plants grown in smaller quantities for ornamental purposes, e.g. for use in decorating homes and public buildings, or those grown for resale to commercial retail outlets, from those grown for large agricultural operations. Many plants grown for decorative purposes are not susceptible to fertilization methods employed in agricultural operations. Furthermore, plants grown for decorative purposes generally leave the floriculturist and are handled by persons of varying degrees of skill, oftentimes, no skill. In addition, pot plants are susceptible to being subject to transfer several times during the early years of plant life. With each transfer, there is a change in environment, significant change in feeding operations, hindering plant growth. It is desirable to provide a plant growth medium which is an integrated matrix and nutrient source so that both the skilled and the unskilled may enjoy equal success with ease of operation. To some degree, this problem was aided by the development of an artificial medium in which all nutrients are supplied in exchangeable form in synthetic ion exchange resins. However, the expense of ion exchange resins has precluded extensive development.

Soil, whether potting soil or field soil, is characterized by its capacity to exchange ions. Plant roots derive their nutrients from soil by the exchange of nutrient ions sorbed on the soil to exchange sites on the roots of the plants. In the absence of a medium for exchanging ions, plants have not been able to survive or grow. Thus, in contrast to soil, growth of plants in sand is notably poor. Most artificial, i.e., non-soil media for growing plants have been notable for their failure. For many years, the only successful, although wholly impractical, "artificial" medium for growing plants was nutrient culture. In this case, all the nutrients are in solution, thereby all nutrients are in an exchangeable medium. In the recent developments employing inert matrixes, the only really useful one has been one in which all of the nutrients were supplied by ion exchange resins where the nutrient source provided the exchange site. The necessity for a medium providing for ample ion exchange is well-known in plant growth technology. Hence, it is completely unexpected and unpredictable to find that by the use of a particular combination and composition of nutrient materials in an environment of very little exchange means, excellent growth of plants can be obtained. It is further unexpected that by use of such appropriate combination, plant growth is obtained which far surpasses that obtained in artificial medium in which all nutrients are supplied in an exchangeable form.

According to the present invention it has been discovered that by providing an integral nutrient plant growth medium comprising a substantially homogeneous, stable, water-insoluble, open-celled, foamed polymer matrix which has intimately imbedded therein, as an integral and unitary part thereof, all essential plant nutrients in a leach-resistant nutrient mixture that very rapid and luxuriant growth of plants and a continued growth of plants for an extended period can be achieved. In the practice of the present invention all essential macro and micronutrients supplies, except nitrogen, are to be supplied in the form of substantially insoluble salts. Although the preferred embodiment of the present invention contemplates the use of naturally occurring insoluble salts, synthetic salt compositions made to have slow release properties of insoluble salts by imbedding or encapsulating in glass, plastic, etc. may also be employed. Since at least part of the nitrogen requirement of plants must be met in the form of nitrate and insoluble nitrates are not ordinarily available, part or all of the nitrogen is supplied in the form of nitrate on anion exchange resins. Instead of supplying all of the nitrogen as nitrate, some of the nitrogen may be supplied in reduced form. By "reduced form" is meant such form as will supply ammonium to plants. When reduced nitrogen is supplied, it is in a slow-release form and may be in the form of slow-release urea-formaldehyde or guanidine-formaldehyde type polymer. In the preferred embodiment all the nitrogen is administered as nitrate. Where nitrates may be prepared in a slow-release insoluble form, such nitrate may be employed. Since such nitrates are difficult to prepare, as a practical matter, nitrate is employed exchanged on an anion exchange resin. In the specification and claims, the expression "leach resistant nutrient mixture" will be employed to mean a mixture as above described in which all nutrients except nitrogen are supplied as a substantially insoluble salt mixture and wherein nitrogen may be supplied completely or partially as nitrate on an anion exchange resin.

The nutrient supplying integral plant matrix of the present invention has many advantages over other known methods for growing plants employing an inert matrix plus nutrients. The advantages include: (1) there is substantially no loss through leaching, (2) the matrix and nutrient is an integral unit adaptable to providing either fixed or non-fixed matrix, (3) more rapid growth may be obtained than that obtained by other methods, (4) longer continued growth is possible in the same matrix without need for fertilization or replanting, (5) the matrix is more adaptable to being modified to the needs of the particular plants and (6) the matrix is relatively inexpensive and is suitable for commercial adaptation. In addition, quite unexpectedly, it has been found that plant growth in the integral matrix of the present invention far surpasses that obtained when all nutrients are supplied by ion exchange resins. Moreover, in view of the fact that natural plant growth matrixes have exchanged properties, it is wholly unpredictable that a synthetic matrix having no exchange properties supplied with substantially insoluble nutrients with only a minor amount of exchanger will support far superior growth of plants than does any other artificial matrix or sand matrix or a similar matrix in which all nutrients are supplied with ion exchange resins.

By "integral" as herein employed is meant that the matrix and nutrient needed for supporting plant growth constitute a composite unit. Thus, for use in growing pot plants, the medium may constitute a single unit, that is, a fixed matrix. For large greenhouse operations, several sections each constituting a single unit may be employed. The fixed matrix has the advantage of being transportable and maintaining a desired shape with or without the plant, and without supporting containers or vessels. It provides a rooting media for cuttings which may be shipped without drying out or being damaged. Furthermore, since roots penetrate the foam, small plants can be grown in small blocks or buns of foam and then when they become larger, they may be planted in soil as a unit without removal from the matrix. Thus, plants can be transplanted without shock usually accompanying transplanting processes. However, if it is desired to grow plants in series, re-using the same medium, the medium may be shredded or ground prior to use providing a non-fixed matrix. Still each shredded or ground unit is an integral matrix having incorporated therein all necessary plant nutrients. Where the bed is to remain in one place, the shredded foam has the advantage over block foam of greater penetrability of roots while at the same time has advantages over conventional growth media in being a complete, self-sufficient nutrient matrix. In addition, unexpectedly superior growth is achieved, especially over that obtained in non-soil growth media.

Polymeric materials suitable as plant matrix in the practice of the present invention are those known in the art to produce open-celled foam structure. The invention is particularly concerned with a matrix prepared from the four major classes of resins known to produce open-celled foam structure, namely, the polyurethanes, epoxy foams, the rubbers and the vinyl foams, but includes all resins foamable to an open-cell foam and embraces all the variations and modifications well-known and widely-used in plastics technology as well as certain other modifications particularly desirable with regard to the present use as hereinafter more fully described.

The expressions "foam" or "foamed polymer" as herein employed refer to foam as is known in the plastics art. It is meant to refer to a foam structure which is stable, water-insoluble and not shortlived. The foam must be water-insoluble to prevent clogging of the cells with a subsequent reduction in porosity. By "open-celled foam structure" as herein employed is meant that at least a significant part of the foam must be open-celled, i.e., having interconnecting cells. Although a completely open-celled foam is preferred, it is not to be construed that foams containing a certain amount of closed cells cannot be used. It is considered that the foam must contain at least 20 percent open-cell structure to permit unhindered root growth and contact with the nutrients imbedded therein.

By "plant nutrients" is meant the macro nutrients essential to plant growth: calcium, nitrogen, phosphorus, sulfur, potassium and magnesium. The invention also embraces the incorporation of micro nutrients or trace elements: boron, manganese, iron, zinc, molybdenum and copper which are necessary for intensive plant growth. When the invention is to be employed and enjoyed in areas where the local water supply is deficient in micronutrients, the addition of micronutrients is an essential part of the invention.

According to the present invention, all nutrients except nitrogen must be provided in substantially insoluble salt mixture as hereinafter defined. Thus, the macronutrients calcium, phosphorus, sulfur, potassium and magnesium and, when employed, the micronutrients above enumerated are provided as substantially insoluble salt mixture. Nitrogen may be supplied completely or in part as nitrate on an anion exchange resin. However, up to about 94 percent of the nitrogen calculated as elemental nitrogen may be supplied as reduced nitrogen in a slow-release form, as hereinafter defined.

By the expression "a substantially insoluble salt mixture" is meant to embrace substantially water-insoluble inorganic salts, fritted inorganic salts and resin-imbedded inorganic salts. By "substantially water-insoluble inorganic salts" is meant those inorganic salts which have a solubility in water of less than 5 grams per liter. By "fritted inorganic salts" is meant inorganic salts which are bound in glass frit so that the solubility does not exceed about 5 grams per liter. By "resin-imbedded inorganic salts" is meant salts which have been bound, imbedded or encapsulated in resin, plastic, wax, etc. so that the salts are difficultly soluble or are only slowly released. The exact form of these slow-release salts is not critical but as with the simple salts or fritted salts, the solubility must not exceed bout 5 grams per liter. Furthermore, the "resin" in the resin imbedded inorganic salts does not have ion exchange properties and is not an ion exchange resin.

Suitable salts for supplying calcium include calcium sulfate, dolomitic limestone ($CaMg(CO_3)_2$), tricalcium phosphate, rock phosphate ($Ca_3(PO_4)_2$), and calcium carbonate. Suitable salts for supplying magnesium include dolomitic limestone, trimagnesium phosphate, magnesium oxysulfate cement, magnesium oxychloride cement, magnesium oxide, ammonium magnesium phosphate and magnesium carbonate. Suitable salts for supplying potassium include potassium metaphosphate, polypotassium metaphosphate and potassium silicate. Potassium oxide fused in glass and available commercially to supply potassium is also suitable. Suitable salts for supplying sulfur include calcium sulfate and magnesium oxysulfate cement. Suitable salts for supplying phosphorus include potassium metaphosphate, polypotassium metaphosphate, tricalcium phosphate, phosphate rock and trimagnesium phosphate.

Suitable sources for micronutrient boron include calcium metaborate and magnesium metaborate. Suitable sources for manganese are manganese oxides and manganese phosphates. Suitable sources for iron are ferrous oxide, ferric oxide, ferrous phosphate and ferric phosphate. Suitable sources for zinc are zinc oxide and zinc phosphates. Suitable sources for molybdenum are molybdenum chlorides. Suitable sources for copper include cuprous oxide, cupric oxide, cuprous phosphates, cuprous carbonates, cupric phosphates and cupric carbonate. Micronutrients may also be supplied in a fritted form, i.e., as slowly soluble glass containing iron, manganese, copper, zinc, boron and molybdenum. Fritten micronutrients are available commercially under trade names as "FTE 503," "FTE 504," "FN 501" and "FN 502" all products of the Agricultural Division of Ferro Corp., Cleveland, Ohio, and serve as a convenient source of micronutrients in a practice of the present invention. Other suitable source of micronutrients include encapsulated or prilled material prepared, for example, by melting a solid waxy water-insoluble binding material such as synthetic resin, asphalt and wax, adding trace elements thereto and solidifying. Slow-release macronutrients may also be prepared in much the same manner. Instead of using molten binder, the nutrient may be mixed with resin and curing agent and cured by baking. Numerous similar slow-release materials prepared for use in soil may be adapted to the present invention provided they meet the requirements of low solubility and lack of exchange property in the carrier.

The expression "synthetic ion exchange resin" or "ion exchange resin" as herein employed means a polymeric material having the capacity to exchange ions with the surrounding medium as the term is understood in the art and embraces natural materials such as coal which may have been modified by chemical treatment to produce ion exchange properties as well as completely synthetic material. It is inclusive of weak and strong ion exchangers as the terms are known in the art. Examples of completely synthetic ion exchange resins are those having a polymeric skeleton such as phenol-formaldehyde, polystyrene, polyolefins, olefin-maleic anhydride copolymers, polyoxyalkylene and polyalkyleneimine compounds and the like containing basic groups capable for exchanging anions.

Anion exchangers generally contain primary, secondary or tertiary amino groups or quaternary ammonium groups. Anion exchangers having amino groups form addition complexes with an acid having the desired anionic group and are classed as weak exchangers. Typical weak exchangers are Dowex–4 and Dowex–3. (Dowex exchangers are commercially available products of The Dow Chemical Company.) In the present applications, such weak exchangers will have nitric acid exchanged thereon. Quaternary ammonium anion exchangers have a hydroxyl or other anionic group exchanged thereon and are classed as strong exchangers, an example of which is Dowex-2. In the present application, such exchanger will have nitrate as the anion exchanged thereon. The exchanger may be strong or weak but is preferably weak, since the latter requires less exchanger. The nitrate-anion exchange resin may be prepared by methods commonly known in ion exchange technology as described in publications such as "Dowex: Ion Exchange" published by The Dow Chemical Company, 1958, pages 18-22. For the practice of the present invention, it is desirable that the resin be of 100 mesh size or greater.

Some of the nitrogen may be supplied in a reduced form rather than as nitrate. When some of the nitrogen is supplied in a reduced form, i.e., as ammonium, it may be by a slow-release nitrogen supplier. A slow-release nitrogen supplier is a urea-formaldehyde or guanidine-formaldehyde type resin available commercially under various trade names.

The leach resistant nutrient mixture containing all nutrients except nitrogen as a substantially insoluble salt mixture and nitrogen partially or completely as nitrate on an anion exchange resin, is added to the foamable polymer mixture prior to foaming in an amount which does not exceed about 65 percent of the weight of said polymer mixture. The leach resistant nutrient mixture contains from about 2 to 60 parts by weight of a substantially insoluble salt mixture selected from the group consisting of substantially water-insoluble inorganic salts, fritted salts and resin imbedded inorganic salts and from about 0.3 to 7.8 parts by weight of nitrogen calculated as elemental nitrogen. Suitable insoluble salt mixtures supply macronutrient elements in amounts set forth in Table I, said amounts being weight of element in total leach resistant mixture.

TABLE I

| Element | Parts by Weight | |
|---|---|---|
| | Operable | Preferred |
| Cations: | | |
| Ca | 1.0-25 | 2.5-19.5 |
| Mg | 0.5-15 | 2.5- 7.5 |
| K | 0.5-25 | 2.0-20.5 |
| Anions: | | |
| P | 1.0-23 | 2.0-16.5 |
| S | 0.5-20 | 1.0-14.0 |

All of the nitrogen may be supplied as nitrate exchanged on anion exchange resin in an amount of from about 1 to 40 parts by weight of anion exchange resin-nitrate per 100 grams of insoluble salt mixture as hereinafter more fully disclosed. Alternatively, part of the nitrogen may be in the reduced form, particularly in the form of urea-formaldehyde resin. Nitrogen may be supplied in the reduced form in an amount of 0 to about 7.3 parts by weight of total nitrogen calculated as elemental nitrogen.

When micronutrients are also supplied, they may be supplied as a micronutrient mixture in an amount by weight of from about 0.5 to about 10 parts by weight which micronutrient mixture supplies micronutrient elements in amounts set forth in Table II.

TABLE II

| Micronutrient: | Parts by weight in leach resistant nutrient mixture |
|---|---|
| Fe | 0.1-1.3 |
| Mn | 0.1-0.7 |
| Cu | 0.1-0.7 |
| Zn | 0.1-0.7 |
| B | 0.05-0.4 |
| Mo | [1] 0.005-0.10 |

[1] Lower limit may be zero, where the water supplies Mo.

The foregoing requirements of micronutrients may be met by fritted micronutrients having the following percent by weight of micronutrient in frit (fritted micronutrient mixture).

TABLE III

| Micronutrient: | Percent by weight of frit |
|---|---|
| Fe | 5-35 |
| Mn | 2-9 |
| Cu | 1.1-4.0 |
| Zn | 0.8-8.6 |
| B | 0.6-4.8 |
| Mo | [1] 0.02-0.87 |

[1] Lower limit may be zero, where the water supplies Mo.

Commercially available fritted micronutrient mixtures are conveniently employed. Examples of commercially available fritted micronutrient mixtures include one sold under the trade name of "FTE-503" having the following composition: 18.0 percent iron, 7.5 percent manganese, 3.0 percent copper, 7.0 percent zinc, 3.0 percent boron, and 0.2 percent molybdenum; and another sold under the trade name of "FTE-504" and having the following compositions: 6.65-7.35 percent copper, 6.65-7.35 percent zinc, 6.65-7.35 percent manganese, 3.60-4.00 percent boron, and 13.30-14.70 percent iron, wherein the foregoing compositions, percent is percent by weight of the total weight of frit.

Typical formulations of insoluble salts are seen in Table IV. If micronutrients are also to be incorporated, from about 0.01 to about 10.0 parts by weight of micronutrient mixture is added to each of the formulations (except Formulation 7 which already contains micronutrients).

TABLE IV

| | Formulation | | | | | | | | | | |
|---|---|---|---|---|---|---|---|---|---|---|---|
| | 1 | 2 | 3 | 4 | 5 | 6 | 7 | 8 | 9 | 10 | 11 |
| Parts by Weight: | | | | | | | | | | | |
| CaSO₄ | 50 | 50 | 50 | 50 | 50 | 75 | 7.3 | 50 | 50 | 65 | 60 |
| Ca₃(PO₄)₂ | 20 | 20 | 20 | 20 | 20 | | | | | | |
| MgO | 20 | 25 | | | | | 6.1 | | | 5 | 5 |
| Mg₃(PO₄)₂ | | | | | | 20 | 12 | | | | |
| Dolomitic limestone | | | 20 | 25 | | | 12.1 | 20 | 10 | | 5 |
| Rock phosphate | | | | | | | | 20 | 20 | | 10 |
| KPO₃ | | | | | | | 24.1 | | | 5 | |
| (KPO₃)ₙ | | | | | | | 48.0 | | | | |
| K-frit | 10 | 5 | 10 | 5 | 10 | 13 | | | | 15 | 10 |
| Fritted micronutrients [1] | | | | | | | 2.4 | | | 10 | 10 |
| K-Silicate | | | | | | | | | | 10 | 20 |
| pH [2] of formulation | 7.9 | 8.15 | 6.25 | 6.35 | 4.8 | 5.1 | 6.6 | 6.25 | 6.55 | 6.6 | 6.45 |

[1] Composition in percent by weight based on total weight of frit: 18% Fe, 7.5% Mn, 3.0% Cu, 7.0% Zn, 3.0% B and 0.2% Mo.
[2] pH determined by allowing formulation in water (saturated solution) to stand overnight and measuring pH with a Leeds & Northrup meter using a glass electrode.

Each of the formulations may be mixed with from 1 to 15 parts by weight of Dowex 4-nitrate or Dowex 3-nitrate or other nitrate bearing weak anion exchanger or from 2 to 40 parts by weight of Dowex 2-nitrate or other nitrate bearing strong exchanger. The resulting leach resistant nutrient mixture is then added to the polymer mixture prior to foaming. The total weight of the leach resistant nutrient mixture must not exceed about 65 percent of the weight of the polymer mixture. Greater amounts of salts will produce a foam having very high density, low porosity and a small percentage of open cells and therefore not adapted to the growing of plants.

As can be seen from Table IV the leach resistant nutrient mixture employed in the present invention may be adapted to preparing compositions which provide growing media of varying pH as desired for the growth of particular plants. Generally, it is desirable to maintain a soil reaction as nearly neutral as possible, but the preferred pH range depends on the particular plant. Thus, plants such as azaleas, rhododendrons, pink lady's slipper and trailing arbutus prefer a definitely acid soil and therefore do better in a medium having a pH range of about 4.5 to 5.5, while herbaceous plants and shrubs grow best at a pH range of from about 6.0 to 7.0. Hence, any artificial plant growth medium must meet similar pH requirements for best plant growth. Leach resistant nutrient mixtures having other pH values may be prepared by appropriate choice of insoluble salts from the knowledge of particular salts as seen in Table V.

TABLE V

| Salt components: | pH (in water) [1] |
|---|---|
| $CaSO_4$ | 6.10 |
| $Ca_3(PO_4)_2$ | 6.30 |
| $Mg_3(PO_4)_2$ | 8.60 |
| $MgO$ | 10.70 |
| $KPO_3$ | 4.05 |
| Mg-oxysulfate cement | 9.75 |
| K-frit | 10.65 |
| Dolomitic limestone | 9.7 |
| $(KPO_3)_n$ | 3.25 |

[1] Determined in same manner as pH of formulations of Table IV.

From such determination a mixture having an appropriate pH may be readily prepared by the skilled in the art to whom this invention is directed.

The pH of a foamed polymer matrix may also be modified by the amount of a particular salt mixture that is added. Thus, a salt mixture having the following composition:

| | Parts by weight |
|---|---|
| Polypotassium metaphosphate | 41.3 |
| Dolomitic limestone | 10.3 |
| Magnesium oxide | 10.3 |
| Calcium sulfate | 5.2 |
| Fritted micronutrients [1] | 2.1 |

[1] Composition same as in Table IV.

which has been foamed in place in varying amounts with 24 grams of Dowex 4-nitrate, 200 grams of polyether isocyanate prepolymer, 0.7 gram of silicone oil, 2.7 grams of stannous octoate catalyst, 5.7 grams of 3 percent aqueous solution of triethylenediamine and 10 grams of perlite is seen to have the following pH values when determined by grinding the foamed matrix, allowing it to stand in distilled water overnight and measuring the pH as above described.

TABLE VI

| Amount of salt mixture (grams): | pH |
|---|---|
| 0 | 4.70 |
| 4.0 | 5.50 |
| 10.0 | 6.15 |
| 20.0 | 6.60 |
| 40.0 | 7.10 |
| 60.0 | 7.60 |
| 80.0 | 7.70 |
| 100.0 | 7.70 |

The integral plant growing medium comprising a foam polymer and leach resistant nutrient mixture is prepared by mixing together a foamable polymeric material and the nutrient mixture and thereafter foaming according to procedures well recognized by those skilled in the art. Those polymer foams which require curing to form a stable foam are thereafter heated at the temperature for the time prescribed for the particular resin foam. Foaming may be carried out in any suitable mold or vessel and may be in the final desired shape or may be subsequently cut to any desired shape.

The preferred foam matrix according to the present invention is a polyurethane or modified polyurethane foam matrix wherein a polyester or polyether resin, diisocyanate, nutrient mixture, modifying agent (if employed) and a foaming catalyst comprising a water-catalyst mixture are reacted together according to any of the three foam producing methods of modifications thereof. Suitable polyesters or polyethers include polybutylene glycols, polyethylene glycols, polypropylene glycols, polyoxyalkylene glycerol, mixed polypropylene-polyethylene glycols sold under trade names as "polyglycol B series or P series" (products of The Dow Chemical Company), diethylene glycol-adipic acid polyesters and caprolactone polyesters. Suitable diisocyanates include toluene diisocyanate, 1-chloro-2,4-phenylene diisocyanate, m-phenylene diisocyanate, p-phenylene diisocyanate, 4,4'-methylenebis (phenyl isocyanate) and 3,3'-dimethoxy-4,4'-biphenylene diisocyanate. Suitable catalysts are tertiary amines such as N-methylmorpholine, diethylethanolamine, triethylenediamine, etc. Other catalysts include stannous octoate. Modifying agents include oil-soluble dyes and pigments, cross-linking agents such as ethylene glycol, di- and triethylene glycol to provide more rigid structure, cell-size regulator such as silicone oil, and moisture-retainers such as perlite, vermiculite and silica gel.

One method and the preferred method of preparing a nutrient charged foam matrix according to the present invention is the method known in the polyurethane art as the "one shot technique" wherein polyester resin, diisocyanate, nutrient mixture, moisture retainer or other additaments (if employed) and water-catalyst mixture are mixed together to produce a polyurethane foam matrix containing leach resistant nutrients.

An alternative method is the prepolymer method of producing foam. The prepolymer is available commercially or may be made by heating a polyether or polyester and a diisocyanate at a temperature in the range of from about 50° C. to about 120° C. for such time and in such proportions as to produce a liquid prepolymer product. The exact time required varies with the temperature and relative amounts of the component polymers but is generally considered to be from about 2 to 4 hours. Suitable ratio of component polymers to produce a foamable prepolymer is from about 80 to 60 parts by weight of polyester or polyether to about 20 to 40 parts by weight of diisocyanate.

The prepolymer, water-catalyst mixture, nutrient mixture, cell-size regulator, and other additaments are mixed together to produce a foamed polyurethane polymer containing and intimately incorporated therein leach resistant plant nutrients. Suitable formulations for polyurethane foam plant growth medium is seen from the following table.

TABLE VII

| | Parts by Weight | |
|---|---|---|
| | Operable | Desired |
| Prepolymer | 100 | 100 |
| Amine catalyst | 0-0.01 | 0.0078 |
| Water | 0.5-6.0 | 2.6 |
| Stannous octoate catalyst | 0.5-6.2 | 2.75 |
| Cell size regulator (silicone oil, 50 centistokes) | 0.55-0.70 | 0.61 |
| Anion exchange resin-nitrate | 6.0-28.0 | 14.0 |
| Nutrient salt mixture [1] | 1.0-75.0 | 10.0 |
| Moisture retainer (optional) | 0.0-70.0 | 15.0 |

[1] Formulation 7, Table IV or 20 parts by weight of one of the other formulations plus 0.2 part by weight of micronutrient mixture of Table III.

The foam produced may be cured, if necessary, by heating from about 70° C. to 100° C. for from about 0.5 to 1 hour.

In a third method, the semi-prepolymer foaming method, the ester or ether resin and diisocyanate proportions are altered so that reaction is not complete during the heating process. The proportion of the ester or ether is from about 70 to 50 parts by weight to about 30 to 50 parts by weight of diisocyanate. Alternatively, the same proportions of the ester or ether to diisocyanate may be employed as for the prepolymer method but the mixture is allowed to stand at room temperature for an hour or so before any further additions are made. Thereafter, the nutrient mixture is added and mixed, then the water-catalyst mixture is added and mixed to produce a polyurethane foam matrix having leach-resistant nutrients incorporated therein.

Other modifications of the foaming procedure as known in the art and described in such publications as "Polyurethanes" by Bernard A. Dombrow, Reinhold Publishing Corporation, 1957, may be employed.

The term "modified polyurethane" refers to that in which the physical properties particularly the rigidity, has been modified by the addition of cross-linking agents, such as ethylene glycol, diethylene glycol and other low molecular weight of glycols. The cross-linking agent is added prior to the addition of the water-catalyst mixture. The rigidity may be increased, if desired, by increasing the amount of diisocyanate employed and/or using a lower equivalent weight prepolymer or equivalent weight polyols in the one-shot method.

When the foam polymer matrix is to be derived from epoxy resin, the stock resin mixture, the nutrient mixture and amine hardener may be mixed together and the mixture heated until it is frothed and cured. A complete description of the techniques and components may be found in the epoxide art. A typical stock resin may have the following proportions:

| Constituents: | Parts by weight |
|---|---|
| Epoxy resin | 95 |
| Primary blowing agent | 0.1 to 10 |
| Auxiliary blowing agent | 0 to 55 |
| Surface active agent | 0.01 to 2.5 |
| Foam stabilizer | 0 to 15 |

The amine hardener is added in a ratio of about 2.0 to 20 parts of epoxy resin. The insoluble nutrient salts and resin-nitrate mixture are added in a ratio of from about 1 to 50 parts by weight of mixture to epoxy resin mixture. A representative recipe suitable for such a process is as follows:

| Constituents: | Parts by weight |
|---|---|
| Base resin A | 71.25 |
| Hardener (para-para' - diamino - diphenyl-methane) | 17.00 |
| Blowing agent (para-para'-oxy bis(benzene sulfonyl-hydrazide)) | 0.80 |
| Auxiliary blowing agent (naphtha) | 10.90 |
| Surface active agent (polyoxy-glycol) | 0.05 |
| Nutrient salt mixture [1] | 6–40 |
| Anion exchange resin-nitrate [2] | 6–35 |

[1] 9.0 parts by weight Formulation 7, Table IV, or 10 parts by weight of one of the other formulations in Table IV plus 0.2 part by weight of micronutrient mixture of Table III.
[2] Preferably 14 parts by weight of Dowex 4 nitrate.

The hardener is melted and rapidly mixed with a base resin. To this resin hardener mixture the other components are added and thoroughly mixed. The mixture is then frothed for a time at a temperature of from about 225° F. to 250° F. during which it expands to about 10 times its volume.

A representative recipe suitable for preparing epoxy foam matrix but employing a boron trifluoride catalyst instead of amine in the preparation of the foamed matrix is as follows: An epoxy resin from bisphenol A and epichlorophyrin is reacted with a glycerine-propylene oxide polymer and a polypropylene glycol in the following amounts:

| Constituent: | Parts by weight |
|---|---|
| Diepoxide resin | 72.30 |
| Glycerine-propylene oxide polymer (average m.w. 3000) | 42.00 |
| Polyglycol (average m.w. 2000) | 40.00 |
| Silicone fluid (113 cs.) | 1.54 |
| $BF_3$-triethylene glycol catalyst | 4.63 |
| Freon 11 (trichlorofluoromethane) | 24.70 |
| Nutrient salt mixture [1] | 6–40 |
| Anion exchange resin-nitrate [2] | 6–35 |

[1] Preferably 20.0 parts by weight of Formulation 7 of Table IV, or 10 parts by weight of one of the other formulations of Table IV plus 0.2 part by weight of micronutrient mixture of Table III.
[2] Preferably 32 parts by weight of Dowex 4-nitrate.

All of the components except the catalyst are first mixed together, then the catalyst is stirred into the mixture at room temperature until the mixture begins to foam. After completion of the foaming, the foam is cured at about 70° C. for about 1 hour.

When the foam polymer matrix is to be derived from vinyl resins, the foam matrix containing leach-resistant nutrients may be prepared by mixing a foamable vinyl polymer, nutrient mixture and foaming agent. The latter may be a chemical agent in which case an atmospheric blow technique is employed or may be an inert gas in which a mechanical blow technique is employed. Such techniques are described in plastic publications such as "Modern Plastics Encyclopedia," vol. 35, pages 338–339 (1937) or vol. 36, pages 332–333 (1959). By "vinyl resin" is meant polyvinyl chloride resin or a copolymer resin consisting chiefly of vinyl chloride.

When employing the atmospheric blow technique, the vinyl resin, plasticizer, nutrient mixture and blowing agent are mixed together and the mixture fused in a suitable vessel at a temperature of about 330° to 400° F. and then allowed to expand at atmospheric pressure. A representative recipe suitable for such process is as follows:

| Constituent: | Parts by weight |
|---|---|
| Polyvinyl chloride resin (average molecular weight about 100,000) | 100 |
| Diisooctyl phthalate | 100 |
| Dipropylene glycol dibenzoate | 20 |
| Dibasic lead phthalate | 3.0 |
| 1,1'-Azobis(formamide) (blowing agent) | 1.0 |
| Nutrient salt mixture [1] | 6–40 |
| Ion exchange resin-nitrate [2] | 6–35 |

[1] Preferably 15 parts by weight of Formulation 7 of Table IV, or 10 parts by weight of one of the other formulations of Table IV plus 0.2 part by weight of micronutrient mixture of Table III.
[2] Preferably 30 parts by weight of Dowex 4-nitrate.

Modifiers such as dyes may be added to the above composition as previously described.

When employing the mechanical blow technique, the nutrient mixture is added to and intimately admixed with a foamable vinyl resin mixture (plastisol) in a pressure vessel and carbon dioxide or other inert gas is introduced under pressure until the pressure in the container reaches approximately 100 to 800 pounds per square inch, the mixture agitated and then discharged into a vessel in the form of a stable expanded creamy foam.

The composition may be varied as is known to those skilled in the art and found in such publications as the Modern Plastics Encyclopedia, and/or by the addition of dye, etc. as previously set forth for foamed polyurethane matrixes.

When the foamed polymer matrix is to be derived from rubber, the nutrient mixture is added to a foamable mixture of rubber as described in "Latex in Industry" by Noble, Rubber Age, 2nd Edition, 1953, pages 603–613, inclusive. The expression "foamed polymer matrix" as applied to rubber embraces both rubber matrix obtained by sponge making process and rubber foam making process. The rubber employed may be either natural rubber or GR-S type latex or a combination thereof or other synthetic rubber prepared according to the teachings described in the above reference or in other sources in the art. The rubber or latex is compounded with the nutrient mixture together with accelerator, vulcanization agents, foaming agents, stabilizers, gelling agents, modifying agents, etc. and then mixed, whipped or otherwise aerated, to produce a foam of any desired degree, then placed in a mold and subjected to vulcanization temperature of 205° to 210° F. for a period of 20 to 50 minutes, or to other known vulcanizing conditions such as steam curing at 5 to 45 pounds pressure or high frequency radiation curing. The nutrient charged foamed matrix is then removed from the mold, washed and dried.

A representative foamable composition for producing a rubber matrix in intimate admixture with nutrient mixture has the following composition:

|  | Parts by weight (dry weight) |
|---|---|
| Styrene-butadiene (70/30) rubber [1] | 100 |
| Carbon black (filler) | 20 |
| Dioctyl phthalate (plasticizer) | 13.3 |
| Ammonium carbonate (blowing agent) | 10 |
| Sulfur (vulcanizing agent) | 2 |
| Zinc oxide (activator for accelerator) | 3 |
| Mercaptobenzothiazole (accelerator) | 3 |
| Stearic acid (activator for accelerator) | 1.5 |
| Nutrient salt mixture [2] | 6-40 |
| Anion exchange resin-nitrate [3] | 6-35 |

[1] Other foamable rubbers may be substituted. Suitable styrene-butadiene (70/30) rubber is COPO-1505 made by emulsion polymerization at 41° F. in resin soap aqueous emulsion with peroxide catalyst and benzyl mercaptan as short stop by Copolymer Rubber and Chemical Corporation of Louisville, Ky.
[2] Preferably 10 parts by weight of Formulation 7 of Table IV, or 10 parts by weight of one of the formulations of Table IV plus 0.2 part by weight of micronutrient mixture of Table III.
[3] Preferably 20 parts by weight of Dowex 4-nitrate.

The components are intimately blended together and vulcanized to produce a foamed or sponge rubber matrix having intimately admixed and imbedded therein a nutrient mixture resistant to leaching.

The foamed matrixes prepared as above described and further illustrated in the working examples have a permanent open-celled structure thereby permitting rapid root growth with the roots coming into intimate contact with plant nutrients. The permanent open-cell structure provides excellent water retention properties to the matrix and avoids the necessity of blending in mulch agents. Furthermore, the amount of water retained by the matrix may be controlled. If excess water is administered, the excess may be squeezed out without damage to the roots. The foam matrix may be in the shape of a flower pot, cube, sphere, sheet, etc.

The foamed matrixes may be further modified by adding an inert compound having a high water-holding capacity. Compounds having this property greatly increase the water retention of the finished matrix. "Popped perlite" or "expanded perlite," a siliceous volcanic glass, primarily an expanded aluminum silicate capable of holding four times its weight in water, has proved to be exceptionally desirable in this application. Vermiculite, shredded cellulose, agar, gelatin, etc. may also be added. When such agents are added, such additions must be made at least simultaneously with or preferably prior to the addition of the water-catalyst mixture to the foamable nutrient mixture.

The plant matrixes prepared as above described are free from fungi, nematodes, insects and other plant infesting insects and require no fumigation or sterilization. The matrix is completely clean and light and can be easily transported. The flexible foam type matrix in particular lends itself to transportation since it can be compressed for shipment. In use, the matrix is planted or seeded in the usual manner such as forming a hole or core and needs only the addition of water to promote plant growth.

The integral plant growth media of the present invention may be further modified or adapted in many ways. Thus, a self-containing unit requiring no water retaining vessel may be prepared with certain foams such as vinyl-resin foam by spraying, slush molding or brushing an unexpanded plastisol against a preheated mold surface, thereafter pouring the foam into the mold and curing the entire assembly, cooling and thereafter stripping the entire unit. The resulting product has its own skin which is not only integral with the foam but may be prepared to have a desired surface design or color. In a similar manner, a mold may be coated with a polyurethane prepolymer, the latter cured to a film and thereafter the polyurethane foamed in the coated mold. Alternatively, the outer surfaces of the foamed matrix may be coated with any water-impervious film for retaining water.

If desired, plant hormones and other growth-promoting agents may be added simultaneously with the leach-resistant nutrient. In addition, if the polymer matrix is to be employed for plants which are ultimately destined for field transplantation where there is high susceptibility to infestation or infection, microbicides, insecticides or other biocides may also be added prior to the foaming process.

The following examples illustrate the invention but are not to be construed as limiting:

EXAMPLE 1

In separate operations, 10 grams and 60 grams of an insoluble salt mixture having the following composition in parts by weight

| | |
|---|---|
| Polypotassium metaphosphate | 41.3 |
| Dolomitic limestone | 10.3 |
| Magnesium oxide | 10.3 |
| Calcium sulfate | 5.2 |
| Fritted micronutrients [1] | 2.1 |

[1] Composition in percent by weight based on total weight of frit: 18% Fe, 7.5% Mn, 3.0% Cu, 7.0% Zn, 3.0% B and 0.2% Mo.

were mixed with 200 grams of polyether isocyanate prepolymer, 0.7 gram of silicone oil (50 centistokes), 2.7 grams of stannous octoate catalyst, 5.7 grams of 3 percent aqueous solution of triethylenediamine, 16.0 grams of horticultural grade perlite and 24.0 grams of the nitrate form of Dowex 4, and foamed in place in 5-inch flower pots.

For comparison, a similar operation was carried out wherein a foamed polymer matrix was prepared in which the polymer was identical to the foregoing but in which all the nutrients were supplied as exchangeable ions on synthetic ion exchange resins as known in the art. A nutrient charged ion exchange resin was prepared having the following proportions in parts by weight:

*Macronutrients*

| | |
|---|---|
| Cations on Dowex-50 [1]: | |
| Potassium | 20 |
| Calcium | 60 |
| Magnesium | 20 |
| Total | 100 |
| Anions on Dowex-4: | |
| Nitrate | 30 |
| Sulfate | 55 |
| Phosphate | 15 |
| Total | 100 |

[1] Sulfonic acid cation exchange resin.

Micronutrients

Cations on Dowex-50:
- Iron ............................................. 39
- Manganese ................................. 19
- Copper ........................................... 2
- Zinc ................................................ 2

Anions on Dowex-2:
- Borate ............................................ 19
- Molybdate ..................................... 19

The nutrient charged ion exchange resin was mixed in such proportions as to supply a ratio of cations to anions of 1:1 and micronutrients in 0.5 percent by weight based on the total macronutrients. 80 grams of such nutrient charged ion exchange resin mixture was mixed with 200 grams of polyether isocyanate prepolymer, 0.7 gram of silicone oil (50 centistokes), 2.7 grams of stannous octoate catalyst, 5.7 grams of 3 percent aqueous solution of triethylenediamine, 16.0 grams of horticultural grade perlite and foamed in place in 5-inch flower pots to form "buns." By "buns" as herein employed is meant a unitary plant matrix which may be lifted out of the flower pot or container without losing shape or needing any support.

Quadruplicate operations were carried out for each composition and tomato seeds were planted in each of the flower pots and grown in a greenhouse for 51 days with daily watering as the only treatment received. After 51 days, the green weights of the plants were determined. The results are set forth in Table VIII.

TABLE VIII

| Experiment: | Average green weight of 4 plants in grams |
|---|---|
| A | 21.0 |
| B | 34.0 |
| C | 6.5 |

A—10 grams of salt mixture plus Dowex-4 nitrate
B—60 grams of salt mixture plus Dowex-4 nitrate
C—All nutrients on exchange resins.

EXAMPLE 2

In a similar manner, foamed nutrient plant matrixes were prepared by mixing together for each matrix, 90 grams of a polyether isocyanate prepolymer, 0.54 gram of silicone oil (50 centistokes), 2.47 grams of stannous octoate catalyst, 2.4 grams of 3 percent aqueous solution of triethylenediamine, 22 grams of Dowex 4-$NO_3$, 3.56 grams of potassium metaphosphate, 0.47 gram of potassium oxide (potassium frit), 1.52 grams of magnesium oxide, 1.0 gram of calcium oxide and 7.3 grams of calcium sulfate hemihydrate, and 0.5 gram of fritted micronutrients having the same composition as that employed in the salt mixture of Example 1. The matrixes were planted to tomato seeds and allowed to grow in the green house for 65 days. Green weights of the plants were then determined and found to be 78.7 grams.

EXAMPLE 3

In a manner previously described, foamed nutrient plant matrix buns were prepared by mixing together the essential components in the amounts set forth in the table below under Column A for each bun. Control operations were carried out in which all nutrients were supplied in the form of ion exchange resins. The amounts of components employed for each bun are set forth in the "Control" column of the table.

| Components | Parts by weight | |
|---|---|---|
| | A | Control |
| Polyether isocyanate prepolymer | 100.00 | 100.00 |
| Silicone oil (50 centistokes) | 0.47 | 0.47 |
| Stannous octoate | 0.53 | 0.53 |
| Dowex 4-$NO_3$ | 32.00 | |
| $CaSO_4$ | 5.00 | |
| $KPO_3$ + magnesium oxychloride cement [1] | 2.00 | |
| 3% triethylenediamine solution | 4.80 | 4.80 |
| Nutrient charged ion exchange resin [2] | | 75.00 |

[1] Preparation of this nutrient mixture was accomplished by adding 2400 g. of $KPO_3$ to a slurry of 1200 g. MgO and 1200 ml. of 20% aq. $MgCl_2$. This was mixed thoroughly and cured in an oven at 80°C. for 16 hours, then crushed and ground to pass a #20 screen.

[2] Nutrients present on exchange resins in parts by weight as follows:
Dowex 50-Ca=13.1  Dowex 4-$NO_3$=7.9
Dowex 50-Mg=4.2  Dowex 4-$SO_4$=9.6
Dowex 50-K=4.8  Dowex 4-$H_2PO_4$=4.5

Two week old tomato plants were transplanted into the buns by placing into holes of about ½ inch in diameter and 1 inch deep which were cut in the tops of the buns, and additional ground matrix packed around the roots to hold the plants in place. The plants were allowed to grow for 98 days with watering as their only care. At the end of this period, the plants were cut and the green weights determined. The average weight of three plants grown on the buns having composition A was 102 grams while the average weights of three plants grown on buns having Control composition was 35 grams.

EXAMPLE 4

In separate replicate operations, 20 grams of a mixture of insoluble salts having the following composition

| | Parts by weight |
|---|---|
| $(KPO_3)_n$ | 41.3 |
| $KPO_3$ | 20.6 |
| Dolomitic limestone | 10.3 |
| MgO | 5.2 |
| $CaSO_4$ | 6.2 |
| Fritted micronutrients [1] | 2.0 |

[1] Composition same as in Example 1.

was employed with each 200 grams of polyether isocyanate prepolymer, 1.3 grams of silicone oil (50 centistokes), 5.5 grams of stannous octoate, 5.4 grams of 3 percent aqueous triethylenediamine and 14.0 grams of vermiculite.

In replicate operations, 10 grams of nitroform (commercial urea-formaldehyde resin containing 38 percent nitrogen by weight in slowly releasable form) and 31 grams of Dowex 4-nitrate were added for each 200 grams of prepolymer employed. In replicate control operations, all nutrients were supplied on ion exchange resins by adding 80 grams of a nutrient charged ion exchange resin mixture having the composition described in Example 1.

The respective mixtures were stirred together to form foamed bun matrixes. Tomato seed were planted to the buns and maintained in the greenhouse for 67 days and thereafter the green weights of the plants determined. The average weights were as follows:

| | Average green weight in grams |
|---|---|
| Insoluble salt mixture+Nitroform+Dowex 4-nitrate | 61.0 |
| Control (all nutrients on ion exchange) | 8.3 |

EXAMPLE 5

In similar separate operations, 10 grams, 60 grams and 100 grams respectively, of an insoluble salt mixture having the same composition set forth in Example 1 were mixed with 200 grams of polyether isocyanate prepolymers, 0.7 gram of silicone oil (50 centistokes), 2.7 grams of stannous octoate catalyst, 5.7 grams of 3 percent aqueous solution of triethylenediamine, 16.0 grams of horticultural grade perlite and 24.0 grams of the nitrate form of Dowex 4 and foamed in a vessel and thereafter shredded. The operations were carried out in quadruplicate. The shredded foam was placed in a 5 inch flower pot and planted to tomatoes, placed in a greenhouse and watered daily. After 51 days, the green weights of the plants were determined. The results are set forth in Table IX.

TABLE IX

| Amount of salt mixture: | Average green weight of 4 plants in grams |
|---|---|
| 10 | 70.5 |
| 60 | 71.5 |
| 100 | 70.0 |

EXAMPLE 6

In operations carried out as previously described, nutrient plant foam matrixes were prepared having the following composition for each plant pot except for the nitrogen which was varied:

| | |
|---|---|
| Ether isocyanate prepolymer grams | 100 |
| Silicone oil (50 centistokes) do | 0.65 |
| Stannous octoate do | 2.25 |
| 3 percent aqueous triethylenediamine do | 2.60 |
| Nutrient salt mixture [1] do | 10.0 |
| Fritted micronutrients [2] do | 0.23 |
| Perlite milliliters | 70 |

[1] Composition same as Example 4.
[2] Composition of Example 1.

The nitrogen was supplied as varying amount of Nitroform, Dowex 4-nitrate or Nitroform+Dowex 4-nitrate mixture as hereinafter more specifically set forth. Each matrix unit containing the foregoing composition was shredded and seeded to Chinese cabbage. The plants were allowed to grow in the greenhouse with only watering for 62 days and thereafter cut and average green weights determined. The results are seen in the following table:

TABLE X

| Grams Dowex 4 Nitrate | Grams Nitroform | Average Green Weights |
|---|---|---|
| 24 | | 105 |
| 32 | | 137 |
| 16 | 5 | 88.6 |
| 16 | 10 | 160.6 |
| | 5 | 34.6 |
| | 30 | Dead |

EXAMPLE 7

In similar operations to those previously described, matrix buns were prepared in which the source of nitrogen was as nitrate on ion exchange resins but in which in one case the resin was Dowex 4, a weak exchanger and in the other case was Dowex 2, a strong exchanger.

The formulation employed, except for the nitrogen, was as follows:

| | |
|---|---|
| Ether isocyanate prepolymer grams | 100 |
| Silicone oil (50 centistokes) do | 0.65 |
| Stannous octoate do | 2.25 |
| Aqueous 3 percent triethylenediamine do | 2.60 |
| Insoluble salt mixture [1] do | 10.0 |
| Fritted micronutrients [2] do | 0.23 |
| Perlite milliliters | 70 |

[1] Salt composition set forth in Example 4.
[2] Composition of Example 1.

The nitrogen was supplied as (1) 24 grams of Dowex 4-nitrate supplying 92 resin equivalents of nitrate and (2) 32 grams of Dowex 2-nitrate also supplying 92 resin equivalents of nitrate. The matrix was foamed in place in 6-inch flower pots and planted to cabbage plants. The plants were grown in the greenhouse for about 62 days and thereafter green weights determined. The average green weight of the plants grown in Dowex 4-nitrate was 32.6 grams. The average green weight of the plants grown in Dowex 2-nitrate was 37.6 grams.

EXAMPLE 8

A nutrient epoxy foam matrix for growing plants is prepared by first preparing a foamable epoxy resin mixture by mixing together 38.8 grams of hyprin triepoxide (1,2,3 - tris-[2-(2,3-epoxy)-2-methylethoxy]propane) and a solution of 38.8 grams of DER 661 (a commercial epoxy resin, epoxide equivalent weight of 475–575, product of The Dow Chemical Company) in 38.8 grams of polyepichlorohydrin diglycidyl ether, and adding to the resulting mixture, a catalyst mixture consisting of 0.16 gram of boron trifluoride complexed with 23.4 grams of triethylene glycol.

20 grams of an insoluble salt mixture having the composition described in Example 1 and 24 grams of Dowex 4-nitrate are added to and mixed with the resin mixture above described. About 5 minutes after all the ingredients are added the mixture starts to foam and an epoxy foam bun is obtained.

A hole ½ inch across and 1 inch deep is cut into the bun and tomato seedling about 2 inches in height inserted in the foam and water applied. The planted foam is placed in a greenhouse to grow into a mature tomato plant.

EXAMPLE 9

A nutrient epoxy foam matrix is prepared in a manner similar to that described in Example 8, but employing the following reactants for the epoxy foam:

| | Grams |
|---|---|
| DER 661 | 31.76 |
| Polyepichlorohydrin diglycidyl ether | 63.52 |
| DER 332 [1] | 31.76 |
| Triethylene glycol | 12.70 |
| Freon TF [2] | 20.26 |
| Boron trifluoride | 0.16 |

[1] Commercial epoxy resin, epoxide equivalent of 173–179, product of The Dow Chemical Company.
[2] Trichlorotrifluoroethane.

10 grams of a nutrient salt mixture having the composition described in Example 1 and 18 grams of Dowex 4-nitrate are added to the foregoing mixture and allowed to foam in a flower pot to obtain foam matrix. A tomato seedling is inserted as described in Example 8 and placed in the greenhouse to grow to maturity.

EXAMPLE 10

An integral plant nutrient growth medium of hydrophilic polyurethane foam matrix is prepared in the following manner. A polyurethane prepolymer is prepared by heating a mixture of 72.8 percent by weight of polyoxyalkylene glycerol and 27.2 percent by weight of toluene diisocyanate. The polyoxyalkylene glycerol employed has a molecular weight of about 3,000 and is prepared by reacting glycerol with propylene oxide and then ethylene oxide. The toluene diisocyanate is a mixture of 80/20 mixture of 2,4- and 2,6-isomers.

The prepolymer thus prepared is modified by adding and mixing silicone oil (50 centistokes) in an amount of 0.6 percent by weight. 90 grams of the modified prepolymer is intimately mixed with 60 grams of nutrient salt mixture described in Example 4 and 14 grams of Dowex 4-nitrate in polyethylene container. The mixture is foamed by adding in bulk and briefly stirring a water-catalyst mixture having the following composition:

| | Grams |
|---|---|
| N-methyl morpholine | 0.90 |
| Triethylenediamine | 0.27 |
| Triethylamine | 0.18 |
| Water | 2.00 |

The foam thus prepared is planted to cabbage seeds and placed in the greenhouse to germinate and grow into mature cabbage plants.

EXAMPLE 11

A polyurethane prepolymer is prepared by heating a mixture of 74.2 percent by weight of polypropylene glycol and 25.8 percent by weight of toluene diisocyanate. The polypropylene glycol employed has a molecular weight of about 3000 and is prepared by reacting glycerol with propylene oxide. The toluene diisocyanate is a 80/20 mixture of the 2,4- and 2,6-isomers.

The prepolymer thus prepared is modified by adding and mixing silicone oil (50 centistokes) in an amount of 0.6 percent by weight. 90 grams of the prepolymer is intimately mixed with 10 grams of a nutrient salt mixture having the following composition:

| | Parts by weight |
|---|---|
| $(KPO_3)_n$ | 48 |
| $KPO_3$ | 24.1 |
| Dolomitic limestone | 12.1 |
| MgO | 6.1 |
| $CaSO_4$ | 7.3 | and 14 grams of Dowex 4-nitrate. The mixture is foamed by adding the catalyst mixture described in Example 10. The foam thus prepared is shredded and used in the same manner as potting soil for growing narcissus from bulbs to full blooming plants. Only water is added during the plant life cycle.

EXAMPLE 12

An integral nutrient plant growth medium of vinyl foam matrix is prepared by mixing together 100 grams of polyvinyl chloride resin (average molecular weight, 100,000), 100 grams of diisooctyl phthalate, 20 grams of dipropylene glycol dibenzoate, 3.0 grams of dibasic lead phthalate, 1.0 gram of 1,1'-azobis(formamide), 15 grams of nutrient salt mixture having the composition of Formulation 7 of Table IV, and 30 grams of Dowex 4-nitrate and fusing the mixture at temperatures of about 350°–370° F. The fused mixture is then poured into a rectangular shaped mold and allowed to expand at atmospheric pressure to produce an integral nutrient plant growth medium in which the foamed polymer matrix is vinyl foam.

The foamed matrix thus prepared is stripped from the mold, placed on a tray, plugs of about 1½ inch depth cut out and planted with rooted cuttings of ivy, the remainder of the hole filled with the plug after first shredding, and the plants placed in a greenhouse maintained at about 68°–75° F. and 60 to 90 percent relative humidity. The plants are watered weekly and the plants allowed to root and grow.

EXAMPLE 13

An integral nutrient plant growth medium of foamed rubber matrix is prepared by blending together 300 grams of a commercial 70/30 styrene-butadiene rubber, 60 grams of carbon black, 40 grams of dioctyl phthalate, 30 grams of ammonium carbonate, 6 grams of sulfur, 9 grams of zinc oxide, 9 grams of mercaptobenzothiazole, 4.5 grams of stearic acid and 20 grams of nutrient salt mixture of Formulation 7 of Table IV. The blended mixture is thereafter heated in a rectangular mold at about 300° F. for about 25 minutes whereupon the foamed matrix is produced. The integral nutrient matrix is then shredded and placed in 6-inch flower pots and planted to carnation seeds. The pots are placed in a greenhouse maintained at about 75°–80° F. and 40 to 80 percent relative humidity. The pots are watered daily whereupon the seeds germinate and the plants grow to maturity.

We claim:

1. An integral nutrient plant growth medium consisting essentially of a stable, water-insoluble, open-celled, foamed polymer matrix having intimately imbedded therein as an integral part thereof, plant nutrients in a leach resistant nutrient mixture, wherein said leach resistant nutrient mixture contains from about 2 to 60 parts by weight of a substantially insoluble salt mixture selected from the group consisting of substantially water-insoluble inorganic salts, fritted salts and resin imbedded inorganic salts and from about 0.3 to 7.8 parts by weight of nitrogen calculated as elemental nitrogen, wherein said nitrogen is supplied at least in part as nitrate exchanged on an anion exchange resin, and wherein said leach resistant nutrient mixture is added in an amount which does not exceed about 65 percent of the weight of the polymer mixture prior to foaming.

2. An integral nutrient plant growth medium consisting essentially of a stable, water-insoluble, open-celled, foamed polymer matrix having intimately imbedded therein as an integral part thereof, plant nutrients in a leach resistant nutrient mixture, wherein said leach resistant nutrient mixture contains from about 2 to 60 parts by weight of a substantially insoluble salt mixture selected from the group consisting of substantially water-insoluble inorganic salts, fritted salts and resin imbedded inorganic salts and from about 0.3 to 7.8 parts by weight of nitrogen calculated as elemental nitrogen of which from 0 to about 94 percent by weight of said nitrogen is supplied in the reduced nitrogen form and the remainder is in the form of nitrate exchanged on an anion exchange resin, and wherein said leach resistant nutrient mixture is added in an amount which does not exceed about 65 percent of the weight of the polymer mixture.

3. An integral nutrient plant growth medium consisting essentially of a stable, water-insoluble, open-celled, foamed polyurethane matrix having intimately imbedded therein as an integral part thereof, plant nutrients in a leach resistant nutrient mixture, wherein said leach resistant nutrient mixture contains macronutrients in amounts of from about 1 to 25 parts by weight of calcium, about 0.5 to 15 parts by weight of magnesium, about 0.5 to 25 parts by weight of potassium about 1 to 23 parts by weight of phosphorus, about 0.5 to 20 parts by weight of sulfur wherein said macronutrients are supplied in the form of an insoluble salt mixture selected from the group consisting of water-insoluble inorganic salts, fritted inorganic salts and resin imbedded inorganic salts, and from about 0.3 to 7.8 parts by weight of macronutrient nitrogen wherein from 0 to about 94 percent by weight of said nitrogen is supplied as reduced nitrogen and the remainder is supplied as nitrate exchanged on an anion exchange resin; and wherein said leach resistant nutrient mixture is added in an amount which does not exceed about 65 percent by weight of the polymer mixture prior to foaming.

4. A complete nutrient plant growth medium consisting essentially of a stable, water-insoluble, open-celled, foamed polymer matrix having intimately imbedded therein as an integral part thereof, all plant nutrients in a leach resistant nutrient mixture, wherein said leach resistant nutrient mixture contains macronutrients other than nitrogen in the form of a substantially insoluble salt mixture in an amount of from about 2 to 60 parts by weight, micronutrients in the form of fritted salts in an amount of from about 0.5 to 10 parts by weight, and nitrogen in an amount of from about 0.3 to 7.8 parts by weight calculated as elemental nitrogen, wherein said nitrogen is supplied at least in part as nitrate exchanged on an anion exchange resin, and wherein said leach resistant nutrient mixture is added in an amount which does not exceed about 65 percent of the weight of the polymer mixture prior to foaming.

5. A complete nutrient plant growth medium consisting essentially of a stable, water-insoluble, open-celled, foamed polymer matrix having intimately imbedded therein as an integral part thereof, all plant nutrients in a leach resistant nutrient mixture, wherein said leach resistant nutrient mixture contains macronutrient elements in amounts of from about 1 to 25 parts by weight of calcium, about 0.5 to 15 parts by weight of magnesium, about 0.5 to 25 parts by weight of potassium, about 1 to 23 parts by weight of phosphorus, and about 0.5 to 20 parts by weight of sulfur, and from about 0.3 to 7.8 parts by weight of nitrogen, wherein calcium, magnesium, potassium, sulfur and phosphorus are supplied in a substantially insoluble salt mixture selected from the group consisting of substantially insoluble inorganic salts, fritted inorganic salts and resin imbedded inorganic salts, and nitrogen is supplied in the form of nitrate exchanged on an anion exchange resin; and from about 0.1 to 1.3 parts by weight of iron, from about 0.1 to 0.7 part by weight of manganese, from about 0.1 to 0.7 part by weight of copper, from about 0.1 to 0.7 part by weight of zinc, from about 0.05 to 0.4 part by weight of boron and from 0 to about 0.1 part by weight of molybdenum; wherein said leach resistant nutrient mixture is added in an amount which does not exceed about 65 percent by weight of the polymer mixture prior to foaming.

6. A complete nutrient plant growth medium consisting essentially of a stable, water-insoluble, open-celled, foamed polymer matrix having intimately imbedded therein as an integral part thereof, all plant nutrients in a leach resistant nutrient mixture, wherein said leach resistant nutrient mixture contains macronutrient elements in amounts of from about 2.5 to 19.5 parts by weight of calcium, about 2.5 to 7.5 parts by weight of magnesium, about 2 to 20.5 parts by weight of potassium, about 2 to 16.5 parts by weight of phosphorus, about 1 to 14 parts by weight of sulfur, wherein said macronutrients are supplied in the form of insoluble salt mixture selected from the group consisting of water-insoluble inorganic salts, fritted inorganic salts and resin imbedded inorganic salts; from about 0.3 to 7.8 parts by weight of nitrogen wherein from 0 to about 7.3 parts by weight is supplied as reduced nitrogen and the remainder is supplied as nitrate exchanged on an anion exchange resin; and micronutrients in amounts of from about 0.1 to 1.3 parts by weight of iron, from about 0.1 to 0.7 part by weight of manganese, from about 0.1 to 0.7 part by weight of copper, from about 0.1 to 0.7 part by weight of zinc, from about 0.05 to 0.4 part by weight of boron and from 0 to about 0.1 part by weight of molybdenum, wherein said micronutrients are supplied in the form of fritted inorganic salts; and wherein said leach resistant nutrient mixture is added in an amount which does not exceed about 65 percent by weight of the polymer mixture prior to foaming.

7. A complete nutrient growth medium according to claim 6 wherein the foamed polymer matrix is polyurethane.

8. A complete nutrient growth medium according to claim 6 wherein the foamed polymer matrix is polyurethane modified by the addition of cross-linking agents.

9. A complete nutrient plant growth medium according to claim 6 wherein the foamed polymer matrix is foamed rubber.

10. A complete nutrient plant growth medium according to claim 6 wherein the foamed polymer matrix is epoxy foam.

11. A complete nutrient plant growth medium according to claim 6 wherein the foamed polymer matrix is vinyl foam.

References Cited

UNITED STATES PATENTS

| | | | |
|---|---|---|---|
| 1,881,195 | 10/1932 | Kaselitz | 71—50 |
| 2,988,441 | 6/1961 | Pruitt | 71—1 X |
| 3,099,896 | 8/1963 | Kurth | 71—1 X |

DONALL H. SYLVESTER, *Primary Examiner.*

R. BAJEFSKY, *Assistant Examiner.*